United States Patent [19]
Chopdekar

[11] 3,855,310
[45] Dec. 17, 1974

[54] METHOD FOR PREPARING PHOSPHORUS COMPOUNDS

[75] Inventor: Vilas M. Chopdekar, Parlin, N.J.

[73] Assignee: M & T Chemicals Inc., Greenwich, Conn.

[22] Filed: Sept. 4, 1973

[21] Appl. No.: 394,174

[52] U.S. Cl. ........... 260/606.5 P, 260/682, 424/300
[51] Int. Cl. .............................................. C07j 9/52
[58] Field of Search............................ 260/606.5 P

[56] References Cited
UNITED STATES PATENTS
3,405,180 10/1968 Natoli.......................... 260/606.5 P
FOREIGN PATENTS OR APPLICATIONS
1,192,205 5/1965 Germany
OTHER PUBLICATIONS
Booth et al., Inorganic Synthesis, Vol. I, (1939), McGraw Hill Book Co., N.Y., N.Y., p. 99–100.

*Primary Examiner*—Daniel E. Wyman
*Assistant Examiner*—A. P. Demers
*Attorney, Agent, or Firm*—Robert P. Auber; Kenneth G. Wheeless; Robert Spector

[57] ABSTRACT

This invention relates to a method for preparing trihydrocarbon phosphorus dihalides by the reaction between a trihydrocarbon phosphine oxide, a phosphorus trihalide and a halogen. The reaction is carried out in the presence of a catalyst selected from N,N-dialkyl amides of aliphatic carboxylic acids containing between one and twenty carbon atoms. The phosphorus compound resulting from the aforementioned reaction is useful in itself. Alternatively, it can readily be converted to a variety of useful compounds, including trihydrocarbon phosphines, using known reactions.

5 Claims, No Drawings

METHOD FOR PREPARING PHOSPHORUS COMPOUNDS

BACKGROUND

This invention relates to the production of trihydrocarbon phosphorus dihalides from the corresponding trihydrocarbon phosphine oxides.

As is well known to those skilled in the art, trihydrocarbon phosphorus compounds, typified by triphenyl phosphine find use in a wide variety of processes; the ability of this typical compound to be selectively oxidized to triphenyl phosphine oxide permits its use in processes wherein a particular group must be selectively reduced. Typical of such reactions is the Wittig reaction wherein a ketone or an aldehyde group may be converted into an olefin linkage. Other reactions are also known wherein triphenyl phosphine may be employed which produce triphenyl phosphine oxide as byproduct. Although these reactions appear to possess a wide range of utility in the field of organic chemistry, commerical relization of this potential has been precluded by the high initial cost of triphenyl phosphine and the inability to economically convert by-product triphenyl phosphine oxide to triphenyl phosphine. It has long been appreciated that commercial relatization of many of these processes has only been impeded by the lack of a satisfactory technique whereby the by-product may be converted to the charge material.

U.S. Pat. No. 3,405,180 discloses a process for reducing trihydrocarbon phosphine oxides to the corresponding phosphine by reacting the phosphine oxide with specified "halo-complexing agents", including thionyl chloride and the pentahalides of arsenic, antimony, and phosphorus to form an adduct of the corresponding trihydrocarbon phosphorus dihalide with said agent, then heating the adduct to its decomposition temperature. The resultant trihydrocarbon phosphorus dihalide is then reacted with a metallic reducing agent exhibiting an oxidation potential of between 0.75 and 2.5 volts to obtain the trihydrocarbon phosphine.

While the first step of this process does produce relatively high yields of the desired trihydrocarbon phosphorus dihalide, the process is not suitable for large scale production since it requires trihydrocarbon phosphine oxides of greater than about 95% purity to obtain the desirable high yields. Since much of the available trihydrocarbon phosphine oxide is a by-product of reactions employing the corresponding phosphine as a reducing agent, the crude oxide is often less than 80% pure. To attain the purity required for high yields using the aforementioned prior art process employing a phosphorus pentahalide would increase raw material costs to the point where the process would no longer be economically attractive. Even if it were feasible to sufficiently purify the trihydrocarbon phosphine oxide as to make it suitable for use in the prior art process, the other starting material, a phosphorus pentahalide, is considerably more expensive than the corresponding trihalide. It would therefore be highly desirable to generate the pentahalide in the presence of the trihydrocarbon phosphine oxide by means of the known reaction between a phosphorus trihalide and a halogen, since the total cost of these two materials is considerably less than that of the corresponding phosphorus pentahalide.

One objective of this invention is to define an efficient process for preparing trihydrocarbon phosphorus dihalides. A second objective is to provide a process for preparing trihydrocarbon phosphorus dihalides in high yield using a relatively impure grade of trihydrocarbon phosphine oxide as one of the starting materials.

It has now been found that trihydrocarbon phosphorus dihalides can be obtained in relatively high yield from either pure or impure trihydrocarbon phosphine oxides by reacting the oxide with a mixture of a phosphorus trihalide and a halogen. Preferably the reaction is carried out in the presence of between 0.01 and 10%, based on the weight of the oxide, of an N,N- dialkyl amide of a carboxylic acid. The trialkyl phosphorus dihalide can be subsequently reduced to the desired trihydrocarbon phosphine using a variety of metallic reducing agents as taught in the prior art or it can be readily converted to a number of other useful products.

SUMMARY OF THE INVENTION

This invention provides an improved method for preparing trihydrocarbon phosphorus dihalides, the method consisting essentially of the following steps:

1. reacting substantially equimolar quantities of a phosphorus trihalide, $PX_3$, an elemental halogen, $Y_2$, and a trihydrocarbon phosphine oxide, $R_3^1PO$, in the presence of a halobenzene diluent having a melting point of less than about 55°C. and a boiling point below about 250°C., the reaction being carried out at a temperature of between ambient and 100°C. and in the presence of a N,N- dialkyl amide catalyst of the general formula

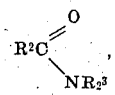

wherein $R^1$ represents an alkyl, cycloalkyl, aryl, alkaryl or aralkyl hydrocarbon radical containing between 1 and 20 carbon atoms, inclusive; $R^2$ and $R^3$ are individually selected from the group consisting of alkyl radicals containing between 1 and 20 carbon atoms, inclusive, and X and Y are individually selected from chlorine, bromine and iodine, 2. removing the phosphorus oxyhalide formed as a by-product of the reaction, and 3. separating the resultant trihydrocarbon phosphorus dihalide from said halobenzene diluent.

DETAILED DESCRIPTION OF THE INVENTION

One of the starting materials employed for preparing the trihydrocarbon phosphine dihalide is a trihydrocarbon phosphine oxide of the general formula $R_3^1PO$, which may be available in pure form or more commonly in crude form, e.g., in solvent, as recovered as by-product from some reaction. Trihydrocarbon phosphine oxides, $R_3^1PO$, which are used in practice of this invention, include compounds wherein $R^1$ is an alkyl, cycloalkyl, aryl, alkaryl, or aralkyl group including such groups when inertly substituted. When $R_1$ is an alkyl group, it includes methyl, ethyl, n-propyl, i- propyl, n-butyl, i-butyl, t-butyl, n-amyl, n-hexyl, 2-ethylhexyl, n-octyl, etc. When $R^1$ is a cycloalkyl group, it includes cyclohexyl, cycloheptyl, etc. When $R^1$ is an aryl group, it includes phenyl and napthtyl. When $R^1$ is an alkaryl group, it may include tolyl and xylyl. When $R^1$ is an aralkyl group, it includes benzyl, phenylethyl, w-phenylpropyl, p-chlorophenylpropyl and m-methoxyphenylethyl. All of the $R^1$ groups need not be the same.

Triphenyl phosphine oxide, a preferred starting material, can be characterized by its M.P. of 152°C.–153°C., its white color, and its analysis of 77.7% C, 5.44% H, 11.13% P, and 5.72% O. Other illustrative available charge materials which may be used in the process of this invention include, e.g., tri(4-chlorophenyl)-phosphine oxide (platelets, M.P. 171.5°C. –172°C. ):, tri(4-tolyl)phosphine oxide (M.P. 145°C., needles from benzene); and tributyl phosphine oxide (B.P. 148°C, –155°C./0.35–0.7 mm Hg.).

The trihydrocarbon phosphine oxide is reacted with a phosphorus trihalide and an elemental halogen. The trichloride, tribromide and triiodide are all suitable for use in the present method. The trichloride is preferred, since it is usually the least expensive of the three and does not have the toxicity hazards of the tribromide. Depending upon the halogen desired in the final product, chlorine, bromine or iodine can be employed as the elemental halogen, and need not be the same as the halogen present in the phosphorus trihalide. While it is possible to prepare trihydrocarbon phosphorus dihalides by combining a trihydrocarbon phosphine oxide with a phosphorus trihalide followed by the gradual addition of the elemental halogen, to the resultant mixture, it has been found that the yield of product can be substantially increased if the phosphorus trihalide and the elemental halogen are added concurrently and at substantially the same stoichiometric rate to a solution of the trihydrocarbon phosphine oxide in a halogenated benzene solvent. The reaction is often exothermic and external cooling may therefore be necessary to maintain the temperature of the reaction mixture within the desired range of between ambient and about 100°C. Both product yield and reaction rate can be further increased if the foregoing reaction is carried out in the presence of between 0.01 and 10% based on the phosphine oxide, of an amide catalyst, specifically an N,N-dialkyl amide derived from a carboxylic acid containing between 1 and 20 carbon atoms. Suitable carboxylic acids include formic, acetic propionic, butyric, isobutyric, pentanoic, hexoic, decanoic, dodecanoic, and eicosanoic acids. The acid may contain one or more double bonds between adjacent carbon atoms, such as are present in maleic and oleic acids. The alkyl radicals bonded to the nitrogen atoms of the amide each contain between 1 and 20 carbon atoms. N,N- dimethylformamide is a preferred catalyst for use in the method of this invention.

The first step of the present method is conveniently carried out using a halobenzene solvent having a melting point of less than about 55°C. and a boiling point of less than about 250°C., i.e., a solvent which is a liquid in the range of about 55° C.–250° C. These halobenzene solvents employed are inert, i.e., do not react with the reactants or products of this step or subsequent steps.

Halobenzene solvents having the desired melting and boiling points are monohalobenzenes such as monochlorobenzene or monobromobenzene; dihalobenzenes such as ortho-dichlorobenzene, orthodibromobenzene, metadichlorobenzene, metadibromobenzene, para-dichlorobenzene; trihalobenzenes such as 1,2,3-trichlorobenzene and 1,2,4-trichlorobenzene. Liquid mixtures of halobenzenes such as commercial mixtures of isomers of dichlorobenzene or dibromobenzene or trichlorobenzene may be employed. Mixtures of e.g., 1,2,3-trichlorobenzene and 1,3,5-trichlorobenzene, or mixtures of, e.g, ortho-dibromobenzene and para-dibromobenzene otherwise characterized as noted supra may be employed.

Preferred halobenzene solvents are those containing chlorine. It is found that particularly outstanding results are obtained when the halobenzene solvent is ortho-dichlorobenzene either in pure form, or in commerical form containing minor amounts of other isomers including the meta-isomer and the para-isomer.

It is a feature of this invention that inertly substituted halobenzenes, i.e., those containing on the benzene ring inert substituents such as alkyl, preferably lower alkyl groups can be employed. Typical of such inertly substituted benzenes are chlorotoluenes such as ortho-chlorotoluene, meta-chlorotoluene, and 2,4-dichlorotoluene, and chloroxylenes such as 3-chloro-1,2-dimethylbenzene; 4-chloro-1,3-dimethylbenzene and 3-bromo - 1,4-dimethylbenzene.

The reaction between trihydrocarbon phosphine oxide, phosphorus trichloride and halogen is substantially complete in as short a time as several minutes, however the reaction mixture is preferably heated for between 1 and 3 hours to ensure substantially complete conversion to the desired products.

The reaction which occurs is believed to conform to the equation $PX_3 + X_2 + R_3^1PO \rightarrow R_3^1PX_2 + POX_3$. Removal of the phosphorus oxyhalide ($POX_3$) which is a by-product of the reaction, constitutes the second step of the present method. The oxyhalide is preferably removed by distillation. Phosphorus oxychloride boils at 105°C. under atmospheric pressure. The corresponding oxybromide boils at 193°C.

The residue remaining following removal of the phosphorus oxyhalide consists of a solution of the desired trihydrocarbon phosphorus dihalide in the halogenated benzene diluent with at most small amounts of unreacted starting materials. The trihydrocarbon phosphorus dihalide can be isolated by removal of the diluent under reduced pressure. Alternatively, the solution of the dihalide can be employed directly in a subsequent reaction if the dihalide is an intermediate. The dihalides provide a convenient route to the corresponding trihydrocarbon phosphines which, as previously disclosed, are widely used as a reducing agent.

The trihydrocarbon phosphorus dihalide, typically triphenyl phosphorus dihalide, is reduced to -triphenyl phosphine by the following illustrative reaction:

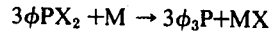

and typically :

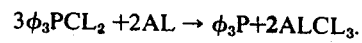

The reduction is effected by means of a metal (M) reducing agent having an oxidation potential (q.v., the Electromotive Series Table-Chart of W. H. Latimer, pub. 1956 by W. M. Welch Mfg. Co.) of 0.75 volt–2.5 volts. Typical of such metals are zinc (0.76 volt), managnese (1.18 volts), aluminum (1.66 volts) and magnesium (1.66 volts). The preferred metal is aluminum. Such metals which may serve as mild reducing agents to permit attainment of the desired results of this invention, are used in bulk or in finely divided form including turnings. When aluminum is employed, divided form including turnings. When aluminum is employed, it is in the form of the so-called aluminum powder, which is a very finely divided form of the metal typically having an average particle size such that it will pass through a 200–300 mesh screen. If zinc metal be employed, it is employed in the form of powdered zinc or mossy zinc. As will be apparent to those skilled in the art, the metal is present in an amount greater than the stoichiometric amount, e.g., in the case of the preferred aluminum, 0.66 mole of aluminum per mole of the dihalide. Preferably reduction is carried out by adding to the, e.g., triphenyl phosphorus dihalide (preferably the dichloride) at least an amount of metal sufficient to combine with the halogen atoms present, and preferably from 10%–100%, say 50% excess.

In the practice of the reduction according to a preferred embodiment, 100 parts by weight of the triphenyl phosphorus dihalide are mixed with 100–500, say 300 parts by weight of a halobenzene solvent. Preferably the same solvent was used in preparing the dihalide. Preferably the mixture of triphenyl phosphorus dihalide, aluminum powder, and halobenzene solvent is heated, with agitation, at reflux temperature, for 20–60 minutes, typically 30 minutes, until the vigorous exothermic reaction subsides. During refluxing, the temperature of the reaction mixture is substantially the boiling point of the solvent. At the end of this time, the reaction mixture is cooled to 50°C.–60°C. and filtered to remove unreacted metal. The organic filtrate is preferably then washed with water, optionally containing sodium chloride, to remove aluminum chloride. The organic layer is then filtered or clarified as required, typically by passage through a bed of diatomaceous earth, following which the organic layer is separated from the halobenzene solvent, typically by heating under vacuum to distill off the solvent. The residue is usually substantially pure triphenyl phosphine which is recovered. If desired, further purification may be effected.

When the final phosphine is one which may be sensitive to heat, as may be the case with the alkyl phosphines, particularly the lower alkyl derivatives, the trihydrocarbon phospine is recovered from the solution in the solvent by extraction with an aqueous solution of quaternizing agent, such as hydrogen chloride. Preferably concentrated aqueous hydrochloric acid is employed. The trihydrocarbon phosphine is extracted in and by the solution typically as, e.g., the trihydrocarbon phosphonium chloride. This solution is separated from the organic layer and then treated with base, such as ammonium hydroxide or sodium hydroxide to neutralize the quaternary salt and liberate the free trihydrocarbon phosphine which is filtered from the aqueous medium.

The trihydrocabon phosphine is characterized by the following illustrative properties: triphenyl phosphine light-to-white solid, M.P. 78°C. -80°C.; tri(4-chlorophenyl) phosphine, M.P. 103°C.; tri(4-tolyl)-phosphine prismatic crystals, M.P. 146°C.; tributyl phosphine, liquid, B.P. 149.5°C./50 mm. Hg. and 129°C. – 130°C./22 mm. Hg.

Preferred embodiments of the present method are set forth in the following examples which should not be considered as limiting the scope of this invention. All parts and percentages are by weight unless otherwise specified.

EXAMPLE 1

This example demonstrates the conversion of an impure grade of triphenyl phosphine oxide to triphenyl phosphine, which cannot be accomplished in high yield using prior art processes.

A sample of triphenyl phosphine oxide (TPPO) was purified by combining 768 parts of crude TPPO with 1626 parts of o-dichlorobenzene and heating the mixture to a temperature of 60°C., at which time an aqueous solution of sodium hydroxide (6 parts NaOH +525 parts water) was added and the resultant 2-phase mixture heated to 95°C. and maintained at that temperature for 1hour. The aqueous phase was discarded and the organic liquid was distilled until the vapor temperature reached 177°C., the boiling point of o-dichlorobenzene. A reaction vessel equipped with a mechanically driven agitator, reflux condenser, additon funnel, gas inlet tube and containing a nitrogen atmosphere was charged with 730 parts of the aforementioned triphenylphosphine oxide solution, which upon analysis was found to contain 0.7 mole of triphenylphosphine oxide. The solution was heated to 70°C., at which time the concurrent addition of phosphorus trichloride (0.75 mole ) and chlorine gas (0.9 mole) was begun. The additions of phosphorus trichloride and chlorine required 2 hours and 125 minutes, respectively, during which time external heating was applied to the reaction mixture as required to maintain the temperature thereof between 71 and 77°C. Following completion of the addition the contents of the flask were heated to 80 ±5°C. for 0.5 hour, than placed under reduced pressure. The temperature of the reaction mixture was increased to 150°C. for the purpose of distilling the phosphorus oxychloride formed as a by-product of the reaction, which required about 0.5 hour. Following completion of the distillation a mixture containing 10 g. of yellow phosphorus and 30 c.c. of o-dichlorobenzene was added to the reaction mixture over a period of 23 minutes while the temperature was maintained between 105 and 115°C. The phosphorus trichloride formed as a by-product was continuously removed by distillation. The o-dichlorobenzene was then distilled away from the reaction mixture, after which 200 g. of heptane and 5 g. activated charcoal were added to the reaction mixture which was then heated to the boiling point for 2 hours under atmosphereic pressure. The reaction mixture was then cooled to 90°C. and the solid material which precipitated was isolated by filtration and washed with 10 g. of warm heptane. The amber-colored filtrate remaining following the aforementioned filtration was combined with 4g. of activated charcoal and heated at the boiling point for one hour, after which it was cooled to 90°C. The precipitated solid was isolated and washed with 10 g. of warm heptane. Upon cooling the filtrate to 25°C., additional solid precipitated, which was recovered and washed with 20 g. of cold heptane. All of the solid material obtained from the reaction mixture was dried at 40°C. under reduced pressure. The dried material weighed 171 g., contained 88% by weight of triphenyl phosphine (equivalent to a yield of 82%, based on the amount of triphenyl phosphine oxide present in the crude starting material) and melted between 77 and 80°C.

As a control, the reduction of impure triphenyl phosphine oxide was attempted using phosphorus pentachloride in place of the combination of phosphorus trichloride and chlorine. A reaction vessel containing a nitrogen atmosphere was charged with 375 g. of a solution of impure triphenyl phosphine oxide in o-dichlorobenzene which had been treated with sodium hydroxide and dehydrated by azeotropic distillation as described in the first section of this example. The solution contained 101 g. of triphenyl phosphine oxide, and was heated to a temperature of 60°C., at which time 87 g. of phosphorus pentachloride was added over a period of 10 minutes. The temperature of the reaction mixture increased to 76°C. without any external heating being applied, and the color of the solution in the reaction vessel became dark. The temperature of the reaction mixture was maintained at 85–90°C. for 0.5 hour following completion of the phosphorus pentachloride addition, after which it was increased to 150°C. The phosphorus oxychloride was distilled away under reduced pressure. The contents of the reaction vessel were then allow to reach atmospheric pressure.

A dispersion of 9 g. powdered aluminum in 20 c.c. of o-dichlorobenzene was added in one portion, whereupon the temperature of the reaction mixture rose spontaneously from 152°C. to 171°C. When the exothermic reaction subsided external heating was applied to maintain the temperature of the reaction mixture at 145–150°C. for 3 hours, after which the reaction mixture remained at ambient temperature for 3 hours. The mixture was then combined with 1 g. of activated charcoal, 1 g. of an activated clay and heated to 100°C. for 1 hour, after which it was filtered and combined with two 250 c.c. portions of water to remove the aluminum chloride formed as a by-product of the reduction reaction. The organic phase of the resultant 2-phase liquid was found to contain 57.2 g. of triphenyl phosphine, which is equivalent to a yield of 60.2%, based on triphenyl phosphine oxide.

The low yield obtained indicates that the prior art method for converting TPPO to the corresponding phosphine by way of triphenyl phosphorus dichloride using a phosphorus pentahalide is not feasible using impure phosphine oxide.

EXAMPLE 2

This example demonstrates a preferred embodiment of the present method, which employs an N,N-dialkyl amide as a catalyst.

A solution of triphenyl phosphine oxide in o-dichlorobenzene was treated with sodium hydroxide and dehydrated using the procedure described in Example 1. A reaction vessel equipped with a mechanically driven stirrer, addition funnel, thermometer, water cooled condenser, and gas inlet tube was filled with nitrogen and then charged with 599 g. of the aforementioned solution, which contained 3.17% by weight of triphenyl phosphine oxide and 1.9% of triphenyl phosphine. The solution was heated with agitation to 80°C., at which time 5 g. of N,N-dimethylformamide was added. Chlorine gas was then bubbled into the reaction mixture and continued for 19 minutes, at which time the addition of 112 g. of phosphorus trichloride was begun and required 90 minutes for completion. A total of 63.5 g. of chlorine gas was added over a period of 1 hour and 55 minutes. The temperature of the reaction mixture was maintained between 82 and 87°C. during the foregoing additions. Following completion of the additions the reaction mixture was maintained at a temperature of 100°C. for 1 hour, at which time the phosphorus oxychloride was removed by distillation at a liquid temperature of 180 –182°C. and a vapor temperature of 175°C. When the reaction mixture temperature decreased to 155°C., a slurry of powdered aluminum metal (17.3 g.) in o-dichlorobenzene (60 c.c. ) was added to the reaction mixture in one portion and the temperature thereof was allowed to reach 180–182°C. spontaneously. Once the exothermic reaction was complete, external heating was applied for 40 minutes to maintain the reaction mixture temperature of 180°C., following which it was decreased to 150°C. for 20 minutes. The unreacted aluminum was removed by filtration after which the solution was cooled to 50°C. and combined with 500 c.c. of water to remove the aluminum chloride formed as a by-product of the reaction. The resultant mixture was heated at 55°C. for 0.5 hour, whereupon the two liquid phases present were separated and the o-dichlorobenzene removed from the organic phase by distillation under reduced pressure (25 m.m. of mercury). When the resultant mixture cooled to 90°C. it was combined with 220 g. of heptane and then heated to 80°C. to dissolve all the solid material present, whereupon 4 g. of activated charcoal were added and the solution heated to reflux temperature for 1.5 hours, cooled to 85°C. and filtered. The solid residue was washed using 20 g. of warm heptane, after which the heptane was removed under reduced pressure. The solid residue was recrystallized by dissolving it in 250 g. of anhydrous isopropanol at a temperature of 65°C. and cooling the resultant solution to 25°C. The recovered white solid was then washed using 50 g. of isopropanol and dried in an oven under reduced pressure. The dried material weighed 165 g., equivalent to a yield of 91%, based on the amount of triphenyl phosphine oxide present in the initial starting material. An additional amount of product was recovered by concentration of the isopropanol employed for the recrystallization, making the total yield 97.5%. The soild material was found to contain 98.0% by weight of triphenyl phosphine.

What is claimed is:

1. A method for preparing trihydrocarbon phosphorus dihalides, $R_3PY_2$ said method consisting of the following steps:

1. reacting substantially equimolar quantities of a phosphorus trihalide, $PX_3$, an elemental halogen, $Y_2$, and a trihydrocarbon phosphine oxide, $R_3{}^1PO$, in the presence of a halobenzene diluent having a melting point of less than about 55°C. and boiling point below about 250°C., the reaction being carried out at a temperature of between ambient and 100°C. and in the presence of between 0.01 and 10%, based on the weight of the phosphine oxide of a N,N- dialkyl amide catalyst of the general formula

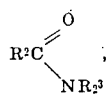

wherein $R^1$ represents an alkyl, cycloalkyl, aryl, alkaryl or aralkyl hydrocarbon radical containing between 1 and 20 carbon atoms, inclusive; $R^2$ and $R^3$ are individually selected from the group consisting of alkyl radicals containing between 1 and 20 carbon atoms, inclusive, and X and Y are individually selected from chlorine, bromine and iodine, 2. removing the phosphorus oxyhalide formed as a by-product of the reaction, and
3. separating the resultant trihydrocarbon phosphorus dihalide from said halobenzene diluent.

2. The method of claim 1 wherein X and Y each represent chlorine.

3. The method of claim 1 wherein $R^1$ represents a phenyl radical.

4. The method of claim 1 wherein the phosphorus trihalide and elemental halogen are added simultaneously to a solution of the trihydrocarbon phosphine oxide in the halobenzene diluent.

5. The method of claim 4 wherein the rates of addition of phosphorus trihalide and elemental halogen are substanially equal, on a molar basis.

* * * * *